United States Patent [19]

Wachter

[11] 4,016,749
[45] Apr. 12, 1977

[54] METHOD AND APPARATUS FOR INSPECTION OF NUCLEAR FUEL RODS

[76] Inventor: William J. Wachter, R.D. 1, English Road, Wexford, Pa. 15090

[22] Filed: July 14, 1975

[21] Appl. No.: 595,577

Related U.S. Application Data

[63] Continuation of Ser. No. 376,697, July 5, 1973, abandoned.

[52] U.S. Cl. ............................ 73/45.5; 176/19 LD
[51] Int. Cl.² ......................................... G01M 3/04
[58] Field of Search ..................... 73/40, 41.2, 45.5; 176/19 R, 19 LD

[56] References Cited

UNITED STATES PATENTS

| | | | |
|---|---|---|---|
| 2,633,740 | 4/1953 | Howe et al. | 73/45.5 |
| 3,356,576 | 12/1967 | McKnight | 73/40 |
| 3,646,804 | 3/1972 | Myers | 73/45.5 |

*Primary Examiner*—Donald O. Woodiel
*Attorney, Agent, or Firm*—Brown, Murray, Flick & Peckham

[57] ABSTRACT

A method and apparatus are provided for the inspection of nuclear fuel rods to detect defects or failures in such rods. Assemblies of fuel rods are immersed in water and means are provided for causing a change in the relative pressures in the water and within the fuel rod such that material is expelled from the rod through any defects that may exist. Means are provided for detecting the emission of bubbles, or other material expelled from the rod, and for locating the position of the defective rod in the assembly. The method is also applicable to detection of contaminants in new fuel rods which may result in the development of defects in the rod.

19 Claims, 5 Drawing Figures

METHOD AND APPARATUS FOR INSPECTION OF NUCLEAR FUEL RODS

This is a continuation, of application Ser. No. 376,697, filed July 5, 1973, now abandoned.

BACKGROUND OF THE INVENTION

The present invention relates to the inspection of nuclear fuel rods, and assemblies of fuel rods, to detect and locate defective rods.

The large nuclear reactors utilized for power generation consist of an array of a large number of fuel rods containing nuclear fuel. Each rod comprises a metal tube which may be from 8 to 15 feet long and approximately ½ inch in diameter, and which contains a stack of cylindrical fuel pellets of suitable fissionable material such as uranium oxide. The upper end of the tube is empty of fuel pellets and forms a plenum for a suitable gas or other fluid under substantial pressure which fills the top of the rod and also the small clearance space which is provided around the pellets to allow for expansion or swelling. The fuel rods are supported in parallel groups in fuel assemblies which may typically contain from 49 to as many as 300 fuel rods, and the complete nuclear reactor is made up of a large number of these fuel assemblies arranged in a suitable configuration.

The metal tubes of the fuel rods constitute the primary containment boundary for the radioactive nuclear fuel, and inspection to verify the integrity of the tubes is of primary importance. In the manufacture of the fuel rods, standard inspections of the tubing itself and of the end cap welds are carried out and helium leak tests of the completed rods are also performed. Since a nuclear reactor may contain as many as 40,000 fuel rods, however, it will be apparent that a significant probability exists that some number of defective tubes will be present even with a highly effective manufacturing quality control program. Furthermore, even initially good fuel rods may develop cracks, pinholes or other defects in service and such defective rods must be detected.

The reactor is usually shut down about once a year for refueling, and at this time as well as during initial installation the fuel rods must be inspected to detect any defective rods that may be leaking fission products. The reactor and the fuel assemblies are immersed in a pool of water during the refueling operations and during removal of the fuel assemblies for replacement or inspection. In the standard method of inspection which has been universally used heretofore, flow of water through each fuel assembly to be inspected is blocked so as to allow the fuel rods to heat up, which causes expulsion of fission products into the water through any defects that may exist in the rods. The water is then checked to detect the presence of radioactivity in the water, indicating that such leakage of fission products has occurred and that a defective rod is present in the assembly being tested. This system requires that the water be pumped to a sampling station and repeatedly analyzed or checked for radioactivity and is a very slow procedure requiring as much as an hour for each fuel assembly. Complete inspection of all the fuel rods in a large power reactor is, therefore, very time consuming and may require as much as a week during which the reactor is out of service. This represents a very high cost to the operator of the reactor and a more rapid but simple and reliable inspection method is needed.

SUMMARY OF THE INVENTION

In accordance with the present invention, a method is provided for quickly and reliably inspecting nuclear fuel assemblies to detect defective fuel rods and to locate the position of the defect. This can be done very quickly during the refueling operation and the expensive and time-consuming inspection methods previously used are eliminated. In its broadest aspects, the new method can be carried out in different ways and is also applicable to the inspection of new fuel rods for locating defects and the presence of contaminants that might result in the future development of defects.

Broadly stated, the new method involves causing a change or perturbation in a physical condition of the fuel rod and instantaneously detecting the resulting effect. More specifically, this may be done by causing a change in the relative pressures of the fluid within the fuel rods and the liquid, usually water, in which they are immersed such that the internal pressure becomes higher than the external water pressure. If there is a defect, such as a crack or pinhole in the rod, the resulting effect is the expulsion of a bubble or bubbles of fluid, and possibly other material, from the interior of the fuel rod into the liquid. Sensing means are provided to detect the emission of the bubble and in this way a reliable and instantaneous indication of the presence of the defect is obtained.

The change in relative pressure may be produced in various ways and the invention includes means for causing such changes. Thus, the temperature of the fuel rods may be raised by the use of a hood which prevents flow of cooling liquid through the fuel assembly, and the resulting increase in pressure of the fluid within the fuel rod causes the emission of a bubble as described above. The change in relative pressure may also be produced by reducing the external pressure. This may be done by means of a special tank in which the fuel assembly is placed and in which it can be pressurized to a desired pressure and immersed in water at the same pressure. The pressure on the water is then released and the internal pressure forces the emission of a bubble of fluid through any defect. In both cases, sensing means are provided to detect the emission of a bubble and thus give an instantaneous indication of the presence of a defect. Preferably also, additional sensors are provided to detect the arrival of the bubble at the surface of the liquid and to locate the position of the bubble which indicates the position of the defective fuel rod in the assembly. Means may also be provided for measuring the time interval between emission of the bubble and its arrival at the surface from which the vertical position of the defect can be determined.

Reduction in external pressure relative to the internal pressure within the fuel rods can also be obtained merely by raising the fuel assembly in the pool of water in which it is immersed, which is normally required in any event during refueling. This reduction in depth of immersion results in a corresponding reduction in pressure of the water surrounding the fuel rods and the emission of a bubble or bubbles fromm any defective fuel rods. Sensing means to detect such bubbles can therefore be provided on the lifting mechanism and in this way defective fuel assemblies can be detected during the refueling operation without any noticeable delay in the operation. Any defective assemblies found in this manner can then be more completely checked by the means referred to above.

The present method can also be applied to inspection of new fuel rods, and particularly to the detection of any contaminants which may cause defects to develop, such as hydrogenous compounds which may exist in the rod as a result of the manufacturing operations. Heating the rod will cause any such contaminants to boil off and the resultant vibration can readily be detected by a suitable vibration sensor so that potentially defective rods can be detected and eliminated.

BRIEF DESCRIPTION OF THE DRAWINGS

The invention will be more fully understood from the following detailed description, taken in connection with the accompanying drawings, in which.

DESCRIPTION OF THE PREFERRED EMBODIMENTS

Figure 1:
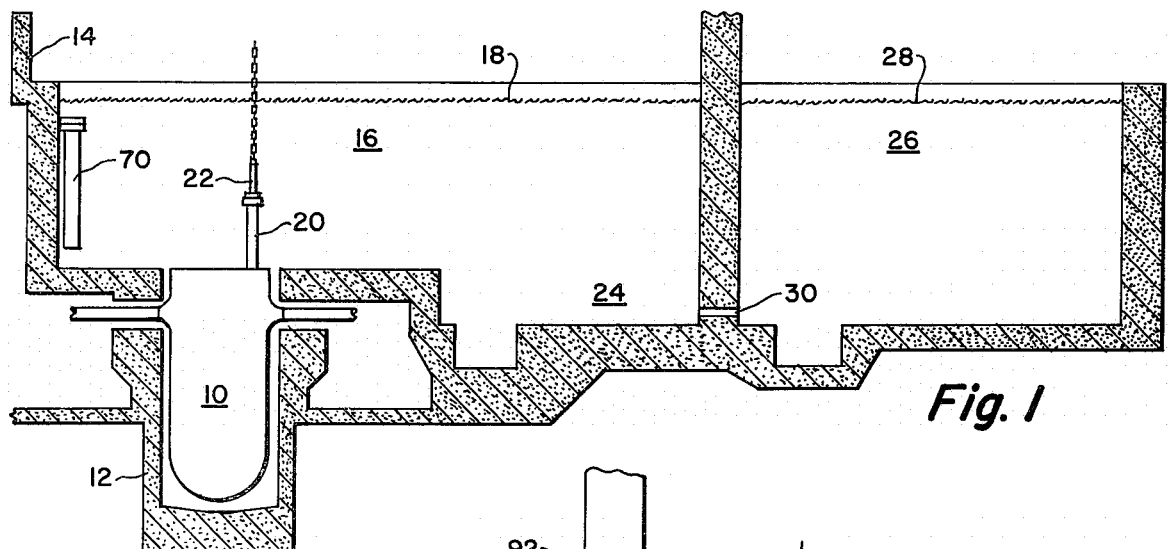
FIG. 1 is a sectional view of a typical nuclear reactor installation in which the method of the present invention may be used.

There is shown in FIG. 1, a typical nuclear reactor installation in which the reactor 10 is supported within a concrete housing 12. The housing 12 forms part of a generally dome-shaped concrete enclosure 14 which includes a basin or pool 16 above the reactor 10. Only the lower portion of the enclosure 14 is shown and it will be understood that it may be of any suitable or usual design. During normal operation, the interior of the pool 16 is empty, but during refueling operations the basin 16 is filled with water up to a level such as indicated at 18, so that the fuel assemblies are kept immersed in water. Suitable crane or other lifting facilities are, of course, provided on tracks (not shown) in the upper part of the enclosure 14. During the refueling operation, fuel assemblies such as the one indicated at 20 are lifted from the reactor by suitable lifting means generally indicated at 22 suspended from the crane. Communicating with or forming a part of the pool 16 is a refueling canal or compartment 24 of concrete which extends to the outer wall of the enclosure 14, as shown. The basin 16 and canal 24 are preferably lined with stainless steel plates which have not been shown for simplicity.

Outside the enclosure 14, there is a spent fuel pit or compartment 26 also of concrete and filled with water up to the level 28. An opening 30 connecting the canal 24 to the pit 26 permits transfer of fuel assemblies from the reactor enclosure to the spent fuel pit by the use of suitable transfer means (not shown). Heretofore, fuel assemblies have been transferred for inspection to the pit 26, maintaining them within the protective water bath, and by using a special container in the pit 26, circulation of water through the fuel assembly was blocked so that its temperature would rise and radioactive fission products would be expelled through any defect into the water within the container. The water from the container was repeatedly drained and checked for radioactivity and in this way defective fuel rods could be detected. It will be obvious that this was a very time-consuming process and very expensive because of the protracted downtime of the reactor which was necessarily involved.

In accordance with the present invention a method and means are provided for rapid and reliable inspection of nuclear fuel rods to eliminate the costly and time-consuming method previously used. A typical fuel rod assembly 32 is shown by way of example in FIG. 2. As previously mentioned, each of the fuel rods 34 comprises a metal tube of a suitable allow which may be of considerable length and relatively small diameter and which contains the nuclear fuel pellets and a fluid, usually gas under substantial pressure. A suitable number of fuel rods 34 is assembled in parallel, closely-spaced relation between a top structure 36 and a bottom support with intermediate supports 40 at intervals throughout the length of the assembly. Other necessary elements such as control rods and means for operating them are also provided but have not been illustrated in detail as they are not a part of the present invention. As previously discussed, the metallic tubes of the fuel rods 34 constitute the primary containment for the radioactive fuel and fission products, and any leak or defect such as a crack or pinhole in any of the fuel rods 34 must be detected and located so that the defective fuel rod can be replaced or repaired. In accordance with the method of the present invention, such defects or leaks are detected by changing the relative pressures of the fluid in the fuel rods and of the water in which the assembly is immersed, so that the fluid pressure becomes greater than the water pressure and bubbles of fluid are forced out of the rod into the water. The emission of such a bubble, therefore, is an indication of the presence of a defect.

Figures 2, 3, 4:
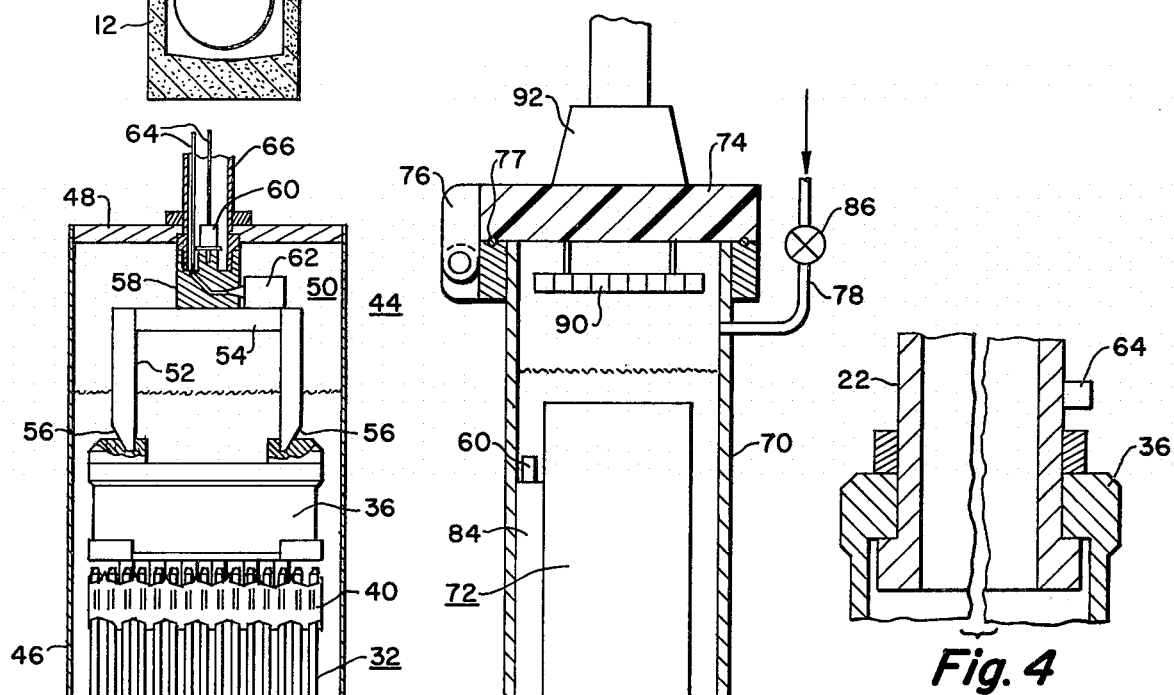
FIG. 2 is a vertical sectional view illustrating one form of apparatus for carrying out the method of the invention.
FIG. 3 is a similar view showing another type of apparatus for carrying out the invention.
FIG. 4 is a partial view of a fuel assembly with a lifting device attached illustrating another means for carrying out the method of the invention.

One suitable means for carrying out this method is illustrated in FIG. 2. As previously mentioned, the fuel assemblies are kept immersed in water, or other suitable liquid, when removed from the reactor 10 in order to prevent overheating of the fuel assembly by the radioactive fuel in the rods 34. The apparatus of FIG. 2 comprises a hood 44 placed over the fuel assembly to be inspected to prevent flow of water through the assembly. The hood 44 consists of a cylindrical body portion 46 of stainless steel sheet, or other suitable material, with a circular top 48 welded to the body. The hood is designed to fit snugly over the fuel assembly 32 as shown in the drawing. When the hood is lowered over the fuel assembly, a certain amount of air is trapped in the hood so that a gas space 50 exists in the top of the hood above the level of the water in which the fuel rods themselves are immersed. Sensing means are provided in the space 50 for detecting the presence and location of any defects in the fuel rods and an anvil 52 is also provided in good mechanical contact with the fuel rod assembly. The anvil 52 is shown as consisting of a transverse bar 54 with vertical members welded to each end and provided with beveled lower ends, indicated at 56, for engagement with correspondingly beveled surfaces provided on the top structure 36 of the fuel assembly. A metal block 58 is welded or otherwise rigidly attached to the transverse bar 54 of the anvil and a mechanical vibration sensor 60 is mounted on the block 58 to detect any vibration transmitted to the anvil 52 from the fuel assembly.

When the hood 44 is lowered into place over the fuel assembly 32, it effectively prevents circulation of the cooling water through the fuel assembly and the temperature of the fuel rods rises. Since this increases the pressure of the fluid in each of the fuel rods, any defect or crack, even a very small one, will permit the expulsion of a bubble of fluid and possibly other material from the interior of the defective rod into the surrounding water. The emission of such a bubble produces a sound or mechanical vibration of the fuel rod which is transmitted to the anvil 52 and picked up by the sensor 60. An output signal from the sensor thus occurs immediately upon emission of a bubble, and the existence of a defective fuel rod is indicated in a reliable and unambiguous manner.

Since thre may be a relatively large number of fuel rods in the assembly, it is usually desirable to determine the location of a defective rod as well as its presence. This can readily be done by observing the position of the emitted bubble on its arrival at the surface of the water within the hood. The hood encloses the fuel assembly quite snugly so that there is little of no movement or circulation of the water, and a bubble emitted from one of the fuel rods travels essentially in a vertical line to the surface. The position of the bubble when it arrives at the surface, therefore, is a reasonably accurate indication of the location of the defective rod in the assembly. Any suitable sensor or other means may be utilized to observe the arrival of a bubble at the surface. Thus, a hydrophone 62 may be mounted in the top of the hood, preferably on the block 58, to detect the sound of a bubble arriving at the surface of the water. The hydrophone 62 is arranged and calibrated to give a directional indication, and thus provides an appropriate location of the bubble so that the position of the defective rod can be determined. It will be understood, of course, that any suitable or desired type of sensors, visual, sonic, subsonic, supersonic, or other, may be utilized in the hood 44 to detect the emission of a bubble and its position on arrival at the water surface. Leads 64 from the sensors 60 and 62 may conveniently be brought out through a lifting rod 66 at the top of the hood. If it is also desired to know the approximate position of the defect in the defective rod, the vertical position of the defect can be determined by observing the time interval between the emission of the bubble of fluid and its arrival at the surface of the liquid. This time interval can readily be measured by the signals obtained from the vibration sensor 60 and the hydrophone 62 and the vertical position of the defect calculated or otherwise determined.

It will be seen that inspection of the fuel assemblies by means of the hood 44 can easily and quickly be carried out. This may be done either in the pool 16 itself or in the canal 24 merely by lowering the hood over the fuel assembly to be inspected and observing or recording the signals from the sensors. The fuel assemblies with defective fuel rods can thus easily and quickly be found and the defective rods located for replacement or repair.

In the embodiment of the invention shown in FIG. 2, the change in relative pressure between the fluid within the fuel rod and the water outside is caused by allowing the rod to heat to increase the internal pressure. The method can also be practiced by reducing the external pressure and means for doing this are shown in FIG. 3. As there shown, a tank or pressure vessel 70 is utilized. The tank 70 is a generally cylindrical metal tank which is designed to be capable of withstanding substantial internal pressure, and is made of the proper size to contain a fuel assembly 72 with some open space at the top. The fuel assembly 72 may be any desired construction and may be like the fuel assembly 32. A cover 74 is provided which may be hinged in place as indicated at 76 and provided with suitable sealing means, such as the O-ring 77, so that the cover can be securely sealed when closed. A connection 78 for a gas supply is provided near the top of the tank 70, and a water supply line 80 and a suction or discharge line 82 are provided at the bottom of the tank. An anvil 84 is provided within the tank which may be a vertically disposed metal bar arranged so as to be in mechanical contact with the fuel assembly 72. A mechanical vibration sensor 60 as previously described is placed on the anvil 84.

In the use of the tank 70, the fuel assembly 72 to be tested is lowered into the tank which is immersed in water, in the reactor pool or otherwise, and the top 74 of the tank is closed and sealed. The water contained in the tank is then pumped out through the drain line 82, and the tank and fuel assembly are pressurized with a suitable gas, such as air or nitrogen, to any desired pressure which may, for example, be in the range from 1/10 pound per square inch up to 600 pounds per square inch. The gas is admitted through the supply line 78 until the desired pressure is reached and is held at this pressure by means of a valve 86. The pressure in the tank is transmitted through any defect in any of the fuel rods so that the internal pressure in any defective rod is the same as that in the tank. Water is then pumped in through the line 80 under the same pressure as that of the gas, and the tank is filled with water under this pressure to a depth sufficient to submerge the fuel assembly 72, the gas being permitted to exhaust as necessary through the valve 86. A valve 88 is provided in the water line 80 to hold the desired pressure in the tank 70. When the tank is thus fully pressurized and filled with water, a valve 89 in the drain line is opened to release the water pressure. This causes a sharp drop in water pressure in the tank and any defective fuel rod in the fuel assembly 72 is then at a higher internal pressure than that of the water so that a bubble of fluid will be emitted. The sound or mechanical vibration resulting from this emission of a bubble is transmitted through the anvil 84 and detected by the sensor 60 so that an immediate indication of the defect is obtained.

The same types of sensors described in connection with FIG. 2 can, of course, be used in the tank 70 to detect the emission of a bubble and to locate its position when it reaches the surface of the water. In FIG. 3, however, another type of sensing means is shown for locating the position of the bubble. As there shown, the cover 74 of the tank is made of a clear plastic, and a plastic grid 90 is mounted on the lower side of the cover extending over the top of the fuel assembly 72. The arrival of a bubble at the surface of the water in the tank 70 can then be directly observed and its position accurately located by reference to the grid 90. This may be done in any suitable manner as by a remotely controlled telescope or, as illustrated, a closed circuit television camera 92 may be utilized to provide a picture at any desired remote location. Preferably, an additional sensor is utilized to accurately detect the arrival of the bubble at the surface, so that the time interval between its emission and its arrival at the surface may be measured to determine the vertical position of the defect as previously discussed. It will be seen that the effect of the tank 70 is essentially similar to that of the hood 44 in that both devices involve the use of an enclosure to cause a change in relative pressures such that the internal pressure in a defective fuel rod becomes greater than the external pressure. Any desired type of sensors may be utilized in either device to detect the emission and location of the resulting bubble.

A reduction in the water pressure surrounding a fuel assembly is also obtained in a much simpler manner during the refueling or inspection operation. When the fuel assemblies are in place in the reactor 10, they are submerged in water to a considerable depth which may be of the order of 60 feet. In the refueling operation, the fuel assemblies are lifted vertically out of the reactor so that their depth of immersion is substantially reduced. If, for example, the fuel assembly is thus raised so that its depth of immersion is only about 30 feet, the pressure of the water surrounding the fuel rod is reduced by one-half. This reduction in external pressure is sufficient to cause the emission of a bubble as previously described which can be utilized as an indication of the presence of a defective fuel rod in the assembly. The lifting means 22 utilized during refueling is shown in an enlarged fragmentary view in FIG. 4 and engages under shoulders formed in the top structure 36 of the fuel assembly to lift the fuel assembly vertically as shown in FIG. 1. For the purposes of the present invention, this provides a sufficient mechanical contact with the fuel assembly to transmit the vibration resulting from the emission of a bubble, and a vibration sensor 60 as previously described is mounted on the lifting device 22 to detect such vibration. In this way, the presence of a defective fuel rod is detected by using the change in external pressure which inherently occurs when the depth of immersion of the fuel assembly in the water is reduced.

It will be apparent that the process of inspection of nuclear fuel assemblies is greatly facilitated and the required time greatly reduced by utilization of either the hood of FIG. 2 or the tank of FIG. 3. An especially rapid and desirable means of performing the inspection, however, is provided by placing a sensor on the lifting device 22 as in FIG. 4. When this is done, each fuel assembly is raised in turn from the reactor and the emission of a bubble noted if any effect exists. Fuel assemblies which may have a defective rod are thus quickly sorted out from the good assemblies without adding any noticeable amount of time to that required in any event for the refueling operation which involves raising and replacing fuel assemblies and changing their positions in the reactor. Thus, the time required is not increased except that those fuel assemblies in which the presence of a defective fuel rod is indicated must be further examined. This can readily be done by means of the tank 70 of FIG. 3 which can conveniently be located, either permanently or temporarily, at one side of the pool 16 as indicated in FIG. 1. Suspect fuel assemblies can then be placed in the tank 70 and checked in the manner previously described. A very rapid but highly reliable inspection method is thus provided. The position of the defective fuel rod in the assembly can be quite accurately determined in the manner described, and even in large assemblies the position of the defective rod can be located within a region of from four to eight rods. These rods can then be removed and individually checked or, if desired, the entire group of rods can be replaced, which would usually be quicker and less expensive.

Figure 5:
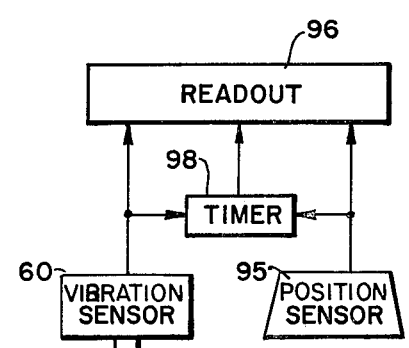
FIG. 5 is a schematic diagram illustrating the operation of a sensor system.

The sensors utilized as described may be designed to provide visual or audible signals, or any desired type of output. Thus, as indicated diagrammatically in FIG. 5, the mechanical vibration sensor 60 and the position location sensor 95, of whatever type is used, may be connected to a readout system 96 of any desired type. A timer 98 may also be provided which measures the time interval between the first signal from the sensor 60, indicating the emission of a bubble, and the signal from the sensor 95 indicating its arrival at the water surface. This time interval may be indicated directly or may be utilized for determining the actual vertical position of the defect. The readout system 96 may be of any type to provide visual, audible or other indications of any or all of the signals described, or any combination of them, or it may produce a permanent record in any desired form.

A method has thus been provided for detecting defective nuclear fuel rods which greatly reduces the time and expense involved in such inspections. The method as described above can also be utilized for inspection of new fuel rods during installation or before. Many fuel rod failures are attributed to hydrogenous impurities introduced into the rod during manufacture. Such contaminants may be present in a fuel rod which initially has no defect but will result in causing a defect after the rod is in service, and it is obviously desirable to detect such a condition. The new method can be applied to detection of such potentially defective rods by inducing a perturbation, specifically boiling of the contaminant, within the fuel rod and detecting the mechanical effect of such perturbation. This may be done by utilizing a tank similar to that of FIG. 3, for example, to heat the fuel rod. No water is used and the fuel assembly or individual fuel rods are placed in the tank which is preferably laid on its side in a furnace or oven. The tank is then heated to heat the fuel rods. The undesirable contaminants have relatively low boiling points, since they are likely to be relatively volatile hydrocarbons or even water, and heating the fuel rods in this manner will cause the contaminants to boil. An audio sensor placed adjacent the fuel rods can then detect the sound of the boiling, or a vibration sensor may be utilized to pick up the resulting vibration. In either case, the presence of the undesirable contaminants is quickly and easily detected and the contaminated fuel rod eliminated.

It will now be apparent that a method has been provided which is generally applicable to the inspection of the fuel rods for nuclear reactors of any type and which may be carried out by means of any desired apparatus, certain preferred types of equipment being disclosed above. It will also be understood that the invention is not limited to the specific arrangements or methods of procedure described but is generally applicable and that various modifications and other embodiments are possible. It is also to be understood that the method is applicable to any type of reactor and any liquid other than water may be utilized for immersion of the fuel rods. Thus, for example, the method can be used equally well where liquid sodium is utilized providing sensors and other equipment are designed to be capable of withstanding the higher temperatures.

I claim as my invention:

1. A method of detecting defects in nuclear fuel rods immersed in a liquid, said fuel rods containing fuel pellets and a fluid, said method comprising the steps of inducing a change in the relative pressures of said liquid and said fluid, and detecting mechanical vibration of said fuel rods induced by emission into the liquid of material expelled from a rod.

2. The method of claim 1 in which said expelled material consists of bubbles of the fluid.

3. The method of claim 1 in which the temperature of the fuel rods is raised to increase the pressure of the fluid.

4. The method of claim 1 in which the depth of immersion of the fuel rods in the liquid is reduced to decrease the liquid pressure around the fuel rods.

5. The method of claim 1 including the steps of pressurizing the fuel rods with gas at a predetermined pressure, immersing the fuel rods in liquid at the same pressure, and releasing the pressure on the liquid.

6. The method of claim 1 including the steps of detecting the emission of a bubble of said fluid from a defective fuel rod and detecting the position of said bubble on arrival at the surface of the liquid to determine the location of the defect in a horizontal plane.

7. The method of claim 6 and including the step of measuring the time interval between emission of said bubble and arrival of the bubble at the surface to determine the vertical location of the defect.

8. Apparatus for detecting defective nuclear fuel rods in an assembly of fuel rods immersed in a liquid, said fuel rods containing fuel pellets and a fluid, said apparatus comprising means for effecting a change in the pressure of the liquid immediately surrounding the rods relative to the pressure of said fluid within the rods, and means associated with said assembly of fuel rods for detecting vibration of the fuel rods induced by emission of material from a rod into the liquid.

9. The apparatus of claim 8 in which said detecting means includes an element in mechanical contact with said assembly, and a sensor adapted to detect vibration of said element induced by the emission of a bubble of fluid.

10. The apparatus of claim 8 including a hood adapted to fit over said assembly of fuel rods to prevent flow of the liquid therethrough, said hood having a gas space in its upper part above the fuel rod assembly, and means in said gas space for detecting emission of a bubble of said fluid from a rod into the liquid.

11. The apparatus of claim 8 including a tank adapted to receive said assembly, means for closing and sealing said tank, means for supplying gas under pressure to the tank, means for draining liquid from the tank and supplying liquid to the tank under pressure at least equal to the gas pressure, and means in the tank for detecting the emission of a bubble of fluid from a rod into the liquid.

12. The apparatus of claim 8 including an enclosure for said assembly of fuel rods for effecting said change in pressure, and means in the upper part of said enclosure for detecting the emission of a bubble of fluid from a defective rod into the liquid and for determining the location of the defective rod.

13. The apparatus of claim 12 including an anvil member is mechanical contact with said fuel rod assembly, and a sensor adapted to respond to vibration of said anvil induced by emission of a bubble of fluid.

14. The apparatus of claim 12 including a sensor adapted to respond to emission of a bubble of fluid, and means for detecting the position of said bubble on arrival at the surface of the liquid in the enclosure to determine the location of the defect in a horizontal plane.

15. The apparatus of claim 14 and including means for measuring the time interval between emission of said bubble and arrival of the bubble at the surface to determine the vertical location of the defect.

16. Apparatus for detecting defective nuclear fuel rods in an assembly of fuel rods immersed in a liquid, said fuel rods containing fuel pellets and a fluid, said apparatus comprising means for effecting a reduction in the pressure of the liquid immediately surrounding the rods, and means associated with said assembly of fuel rods for detecting vibration of the fuel rods induced by emission of a bubble of said fluid from a rod into the liquid.

17. The apparatus of claim 16 in which said detecting means includes an element in mechanical contact with said assembly and sensing means for detecting vibration of said element.

18. The apparatus of claim 16 including means for lifting said assembly of fuel rods to a depth of immersion in the liquid such that the liquid pressure around the fuel rods is substantially reduced.

19. Apparatus for detecting defective nuclear fuel rods in an assembly of fuel rods immersed in a liquid, said fuel rods containing fuel pellets and a fluid, said apparatus including means for lifting said assembly of fuel rods to a depth of immersion in the liquid such that the pressure of the liquid immediately surrounding the fuel rods is substantially reduced, said lifting means being in mechanical contact with said assembly of fuel rods, and sensing means for detecting vibration of the lifting means induced by emission of a bubble of fluid from a rod into the liquid.

* * * * *